United States Patent Office 3,406,640
Patented Oct. 22, 1968

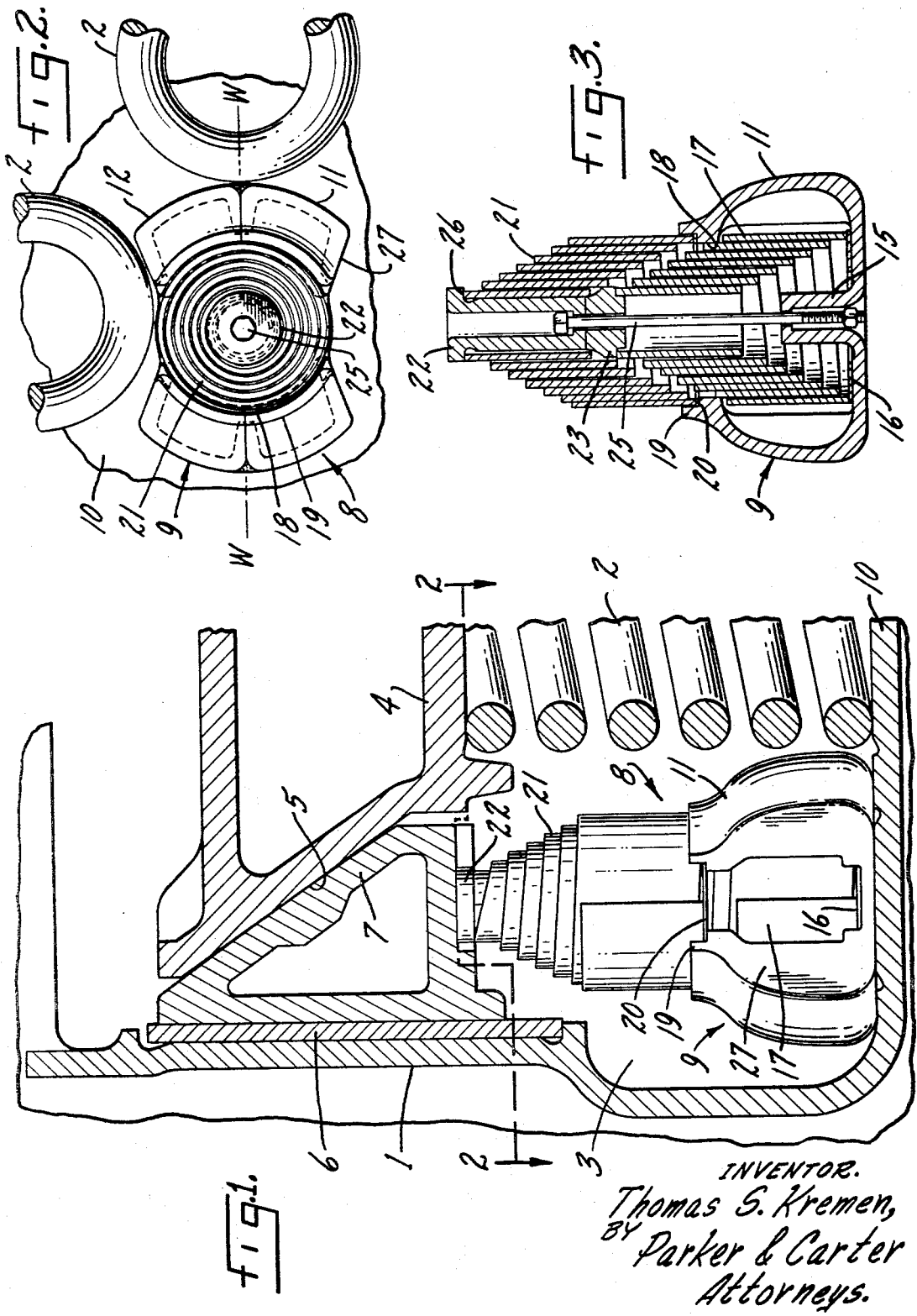

3,406,640
DAMPENED CAR TRUCK BOLSTER
Thomas S. Kremen, Chicago, Ill., assignor to Standard Car Truck Company, a corporation of Illinois
Filed Sept. 16, 1966, Ser. No. 580,028
8 Claims. (Cl. 105—197)

ABSTRACT OF THE DISCLOSURE

The use of a telescoping tandem volute coil spring where the lower coil penetrates the upper, the springs work in tandem and neither one touches the other as a substitute for the conventional coil spring in a railroad car truck damping assembly. The tandem coil springs, one above the other, make it possible to get greatly increased damping pressure in a narrow space.

---

This invention relates to a stabilized car truck wherein friction snubbing or stabilizing means are interposed between the car truck and the car truck bolster or other member supporting the load of the car on the truck and has for one object to provide a mechanism which makes it possible to greatly increase spring pressure on the friction shoe to snub or retard up and down movement of the truck bolster with respect to the car truck.

This invention is applicable for such stabilized car truck as that illustrated in the patent to Clasen No. 3,127,850 or patent to Williams No. 2,827,987.

In stabilized car trucks part of the load is carried by the usual coil spring assembly and a smaller part of the load is carried by the snubber spring. As the loads carried by railroad cars and the speeds at which they travel both increase, it becomes necessary to increase the force exerted by the snubbing springs. The difficulty is that car truck frames, bolsters and the associated parts are pretty well standardized and as a general rule, there is little room in which to increase the load carrying possibilities of the standard coil springs.

This invention proposes to replace the usual coil snubbing springs with a volute spring assembly which is much stiffer, carries a much larger load and takes no more room than the old style coil spring shown in the patents above referred to.

Because the invention is directed to the spring, the drawings illustrate only that part of the car truck where the volute spring is found.

The invention is illustrated diagrammatically in the accompanying drawings, wherein FIGURE 1 is a section through a part of the truck;

FIGURE 2 is a section along the line 2—2 of FIGURE 1;

FIGURE 3 is a vertical section through the volute spring itself.

Like parts are indicated by like numerals throughout the specification and drawings.

The truck frame is shown at 1. The usual load carrying coil springs 2 rest on the bottom of the window 3 in the frame to support the end of the truck bolster 4 which penetrates the window. There is of course the usual windowed side frame and load supporting spring assembly associated with the other end of the bolster across the truck. The support of the car on the truck bolster is not illustrated. The bolster has an inclined wedge wall 5 in opposition to a vertical wear plate 6 on one side of the window 3. The friction wedge 7 is held in frictional engagement in the angle defined by the wedge wall 5 and the bearing surface 6 by the wedge actuating spring assembly 8.

The wedge actuating spring assembly 8 includes a multi-part base 9 which rests on the floor 10 of the window 3 and interlocks therewith in the usual manner. For assembly, this base is made in two or more pieces to be welded or otherwise held together after assembly along the line W—W. The base when assembled includes the segmental bowl shaped elements 11, 12 joined together as indicated after assembly. The sleeve 15 extends up from the base of the bowl. A wear ring 16 encircles the sleeve 15 and a lower volute spring 17 rests on the wear plate, the outer lower coil of the spring 17 being of greater diameter than the mouth 18 of the bowl. The inner coils of the lower spring 17 project upwardly through the mouth of the bowl. The bowl before assembly must be segmental to permit the insertion of the outer coil of the lower volute spring.

The mouth of the bowl is encircled by a collar 19 which bounds the outer periphery of the wear ring 20 which encircles the mouth. An upper volute spring 21 rests upon the wear ring 20. A two part follower 22, shouldered at 23, penetrates and rests upon the upper coil of the lowest volute and at 26 rests upon the inner coil of the upper volute. The follower is in two parts so that the upper cylindrical portion may be inserted into the top inner coil of the upper spring and in assembly may rest upon the lower shouldered portion which, in turn, rests upon the top inner coil of the lower spring. The coils of the two volute springs are in register as indicated. On assembly, prior to installation in a truck, the base or bowl 9 and the follower 22 are held together by a tie bolt 25 contained within the sleeve 15 and the follower 22. The bolt has nothing to do with the operation of the spring. It is necessary before assembly to hold the two springs, the follower and the base together before they are assembled in the car.

The loaded position of the springs is shown in FIGURE 3. The bolt 25 is loose and the coils are not bottomed. Prior to assembly the bolt 25 would be in tension. When the load is great enough to bottom the springs, the coils telescope together and the bolt 25 is still free.

Reinforcing webs 27 extend inwardly from the wall of the base to support and center the outer coil of the lower spring at spaced points around its periphery. The upper coils are assembled in alignment with the lower coils. The volute springs are identical, of uniform pitch, inner and outer diameter and height. Upon assembly, one upon the other with the lower spring in the assembled base, the upper spring is rotated until it is in the same angular position as the lower spring with the coils in line. The bolt is then tightened to draw the two springs together in a sufficient compression to make sure that they remain in alignment for assembly. Thus when load is applied, the coil springs freely telescope one in the other and the spring coils remain in proper alignment.

I claim:

1. In combination, a plurality of substantially identical volute springs axially aligned, load carrying bases supporting the lower outer coil of each spring, a follower concentric with the springs having load applying shoulders engaging the inner upper coil of each spring, the coils of the lower spring projecting upwardly into the coils of the upper spring and normally out of contact therewith.

2. The device of claim 1 characterized by the fact that the base includes a plurality of separate segments which may be joined together to form a bowl enclosing the outer coil of the lower spring and providing a support for the outer coil of an upper spring.

3. The device of claim 2 characterized by the fact that stiffening elements extend inwardly from the wall of the bowl to center the outer coil of the lower spring.

4. The device of claim 2 characterized by the fact that a hollow sleeve extends upwardly from the floor of the bowl concentric with the springs, the follower is tubular and aligned with the sleeve, a tension member is contained within the follower and the sleeve under tension to hold the springs under initial compression, the tension member being free to float in the sleeve and follower as the springs are compressed.

5. The device of claim 2 characterized by the fact that these springs are so positioned angularly about their common axis that as the springs are compressed, the coils of the springs remain in alignment and when compressed the lower edges of the coils of the lower spring may bottom on the inner ring in the base.

6. The device of claim 1 characterized by the fact that the assembly of volute springs is adapted to be mounted in parallel with the coil spring assembly of a railroad car truck side frame which supports the bolster of a railroad car truck.

7. The device of claim 6 characterized by the fact that a damping friction shoe is interposed between the car truck and the car bolster and the volute springs are adapted to apply upward pressure to such shoe to hold the shoe in contact with the truck and bolster.

8. The device of claim 1 characterized by the fact that a hollow sleeve extends upwardly from the base concentric with the springs and that the follower is tubular and aligned with the sleeve there being a retaining device within the follower and sleeve under tension to hold the springs under initial compression, the retaining device being free to float in the sleeve and the follower as the sleeves are compressed.

References Cited

UNITED STATES PATENTS

| 1,956,336 | 4/1934 | Wine | 267—4 |
| 1,970,563 | 8/1934 | Holland | 267—4 |
| 1,990,379 | 2/1935 | Holland | 267—4 |
| 2,105,651 | 1/1938 | Holland | 267—4 |
| 2,587,315 | 2/1952 | Haynes | 105—197 |
| 2,827,987 | 3/1958 | Williams | 105—197 |
| 3,127,850 | 4/1964 | Clasen | 105—197 |

ARTHUR L. LA POINT, *Primary Examiner.*

H. BELTRAN, *Assistant Examiner.*